D. M. McLEAN.
Pot and Kettle.
No. 162,847.  Patented May 4, 1875.
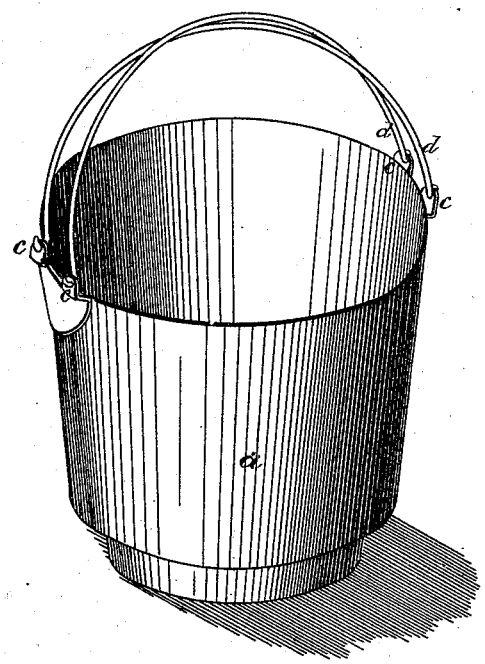
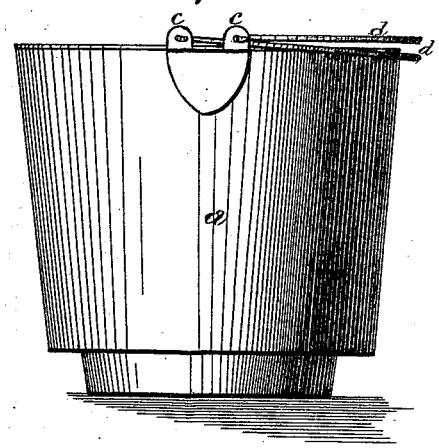
WITNESSES
INVENTOR
Donald M. McLean
per F. A. Lehmann
Atty

UNITED STATES PATENT OFFICE.

DONALD M. McLEAN, OF GLOUCESTER, MASSACHUSETTS.

IMPROVEMENT IN POTS AND KETTLES.

Specification forming part of Letters Patent No. 162,847, dated May 4, 1875; application filed March 26, 1875.

*To all whom it may concern:*

Be it known that I, DONALD M. MCLEAN, of Gloucester, in the county of Essex and State of Massachusetts, have invented certain new and useful Improvements in Pots and Kettles; and I do hereby declare the following to be a full, clear, and exact description of the invention, such as will enable others skilled in the art to which it pertains to make and use it, reference being had to the accompanying drawings, which form part of this specification.

My invention relates to an improvement in pots and kettles; and it consists in providing them with two bails that cross each other, whereby the pot or kettle is prevented from swinging around to one side while being tilted, or from moving too freely on the bail, as will be more fully described hereafter.

The accompanying drawings represent my invention.

$a$ represents an ordinary pot or kettle, upon the sides of which are the four ears $c$, to which the two bails $d$ are attached in the usual manner. These bails, instead of extending straight across, cross each other, as shown, so as to enable the person to better control and manage the pot while pouring out its contents. Where but a single bail is used and it is attempted to tilt the pot, it is liable to swing around to one side, and thus scald the hands of the person managing it. Where two crossed bails are used, the person handling the pot or kettle has only to grasp them firmly together, and the pot can neither tip while being carried, nor swing around while being tilted. When the bails are thus crossed they cannot fall down along the side of the pot, where they become so heated as to burn the hands in taking hold of them. The ears to which the bails are attached have shoulders formed in them, as shown, so that they may act as stops or rests to prevent the bails from dropping down the sides of the pot. Both of the ears on a side will be made in a single piece. The bails may either extend across the top of the pot in a curve, or they may be made square at their centers.

Having thus described my invention, I claim—

1. In combination, with a pot or kettle, $a$, the two bails $d$ $d$, said bails crossing each other between the points of attachment to the pot or kettle, substantially as and for the purpose set forth.

2. The pot or kettle $a$, in combination with the bails $d$ $d$ crossing each other, as described, and the ears $c$ $c$ with shoulders to prevent the bails from falling, as and for the purpose set forth.

In testimony that I claim the foregoing, I have hereunto set my hand this 22d day of March, 1875.

DONALD M. McLEAN.

Witnesses:
 CYRUS STORY,
 B. M. GROVER.